(12) United States Patent
Nakano

(10) Patent No.: US 6,188,847 B1
(45) Date of Patent: Feb. 13, 2001

(54) CAMERA

(75) Inventor: Toshifumi Nakano, Sagamihara (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/356,592

(22) Filed: Jul. 19, 1999

(30) Foreign Application Priority Data

Jul. 31, 1998 (JP) .................................................. 10-217227

(51) Int. Cl.[7] .................................................. G03B 15/03
(52) U.S. Cl. ..................... 396/176; 396/535; 396/541; 396/542
(58) Field of Search .................... 396/176, 177, 396/178, 535, 541, 542

(56) References Cited

U.S. PATENT DOCUMENTS

| | | | |
|---|---|---|---|
| 4,589,747 | * | 5/1986 | Nakayama et al. .................. 396/177 |
| 4,973,998 | * | 11/1990 | Gates .................................... 396/535 |
| 5,021,811 | * | 6/1991 | Maurinus et al. .................... 396/542 |
| 5,235,364 | * | 8/1993 | Ohmura et al. ...................... 396/176 |
| 5,541,688 | * | 7/1996 | Glogan ................................ 396/178 |
| 5,543,876 | * | 8/1996 | Suzuki et al. ........................ 396/176 |
| 5,854,946 | * | 12/1998 | Motomura et al. .................. 396/177 |
| 5,860,033 | * | 1/1999 | Stanchus et al. .................... 396/176 |

FOREIGN PATENT DOCUMENTS 8-76215    3/1996    (JP) .

* cited by examiner

*Primary Examiner*—Russell Adams
(74) *Attorney, Agent, or Firm*—Frishauf, Holtz, Goodman, Langer & Chick, P.C.

(57) ABSTRACT

In a camera having a camera body which includes a film cartridge compartment, a spool compartment, an exposure unit including a lens barrel, and a sheath component that covers the camera body, a flashlight emission unit and an electric circuit unit for activating the flashlight emission unit are both attached to the sheath component.

13 Claims, 3 Drawing Sheets

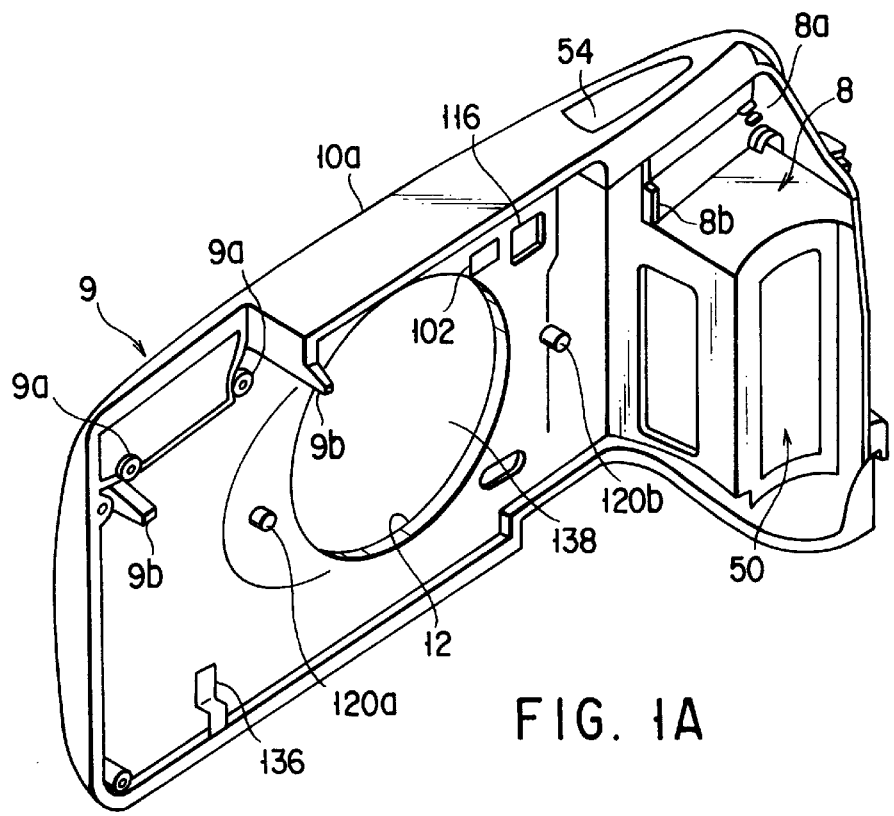
FIG. 1A
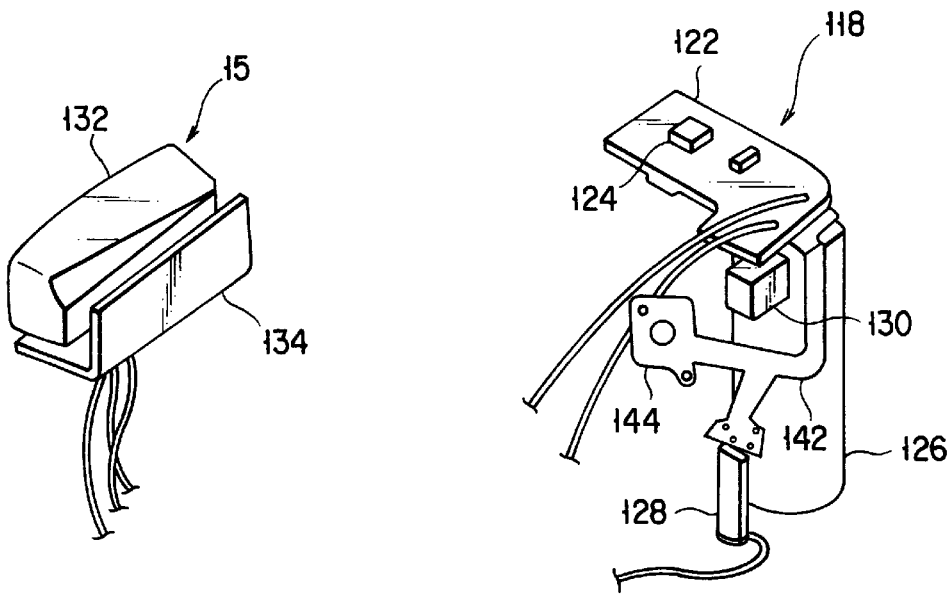
FIG. 1B
FIG. 1C

CAMERA

BACKGROUND OF THE INVENTION

The present invention relates to a camera having a flashlight emission unit.

A conventional camera of this type is described in Jpn. Pat. Appln. KOKAI Publication No. 8-76215, for example. This camera comprises a camera body, which is composed integrally of a film compartment, a cartridge compartment, an exposure unit including a lens barrel, etc., and a sheath component (front and rear covers) for storing the camera body. A flashlight emission unit is mounted on the camera body.

In the case where the flashlight emission unit is mounted on the camera body as the basic structure of the camera, the camera body should be designed having a shape and configuration adaptive to the emission unit.

In producing cameras of various types (e.g., cameras without a flashlight emission unit), therefore, some restrictions on the shape or construction of their bodies may lower the productivity and hinder or retard their miniaturization or design.

BRIEF SUMMARY OF THE INVENTION

The present invention has been contrived in consideration of these circumstances, and its object is to provide a camera enjoying high productivity, in which a flashlight emission unit is attached to a sheath component so that the body of the camera is compatible with cameras of various types.

In order to achieve the above object, a camera according to the present invention comprises, for example, an electric circuit unit for activating a flashlight emission unit and a sheath component that covers a camera body, the electric circuit unit being attached to the sheath component.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a perspective view showing a configuration of a front cover;

FIG. 1B is a perspective view showing a configuration of a flashlight emission unit to be mounted on the front cover;

FIG. 1C is a perspective view showing a configuration of an electric circuit unit to be mounted on the front cover;

DETAILED DESCRIPTION OF THE INVENTION

A camera according to an embodiment of the present invention will now be described with reference to the accompanying drawings.

Figure 2A:
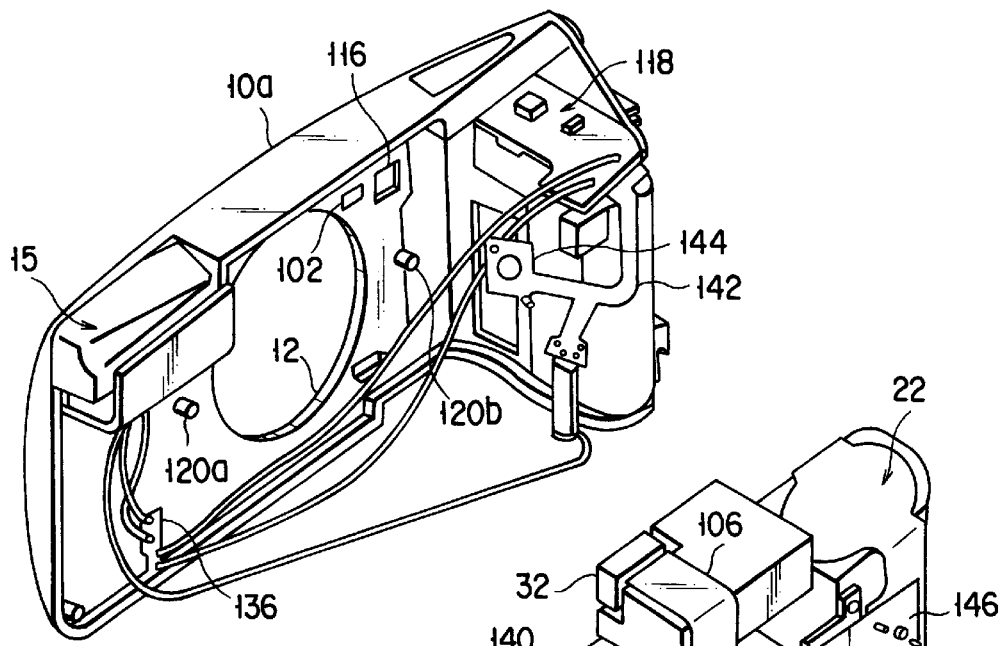
FIG. 2A is a perspective view showing the front cover mounted with the flashlight emission unit and the electric circuit unit.
Figure 2B:
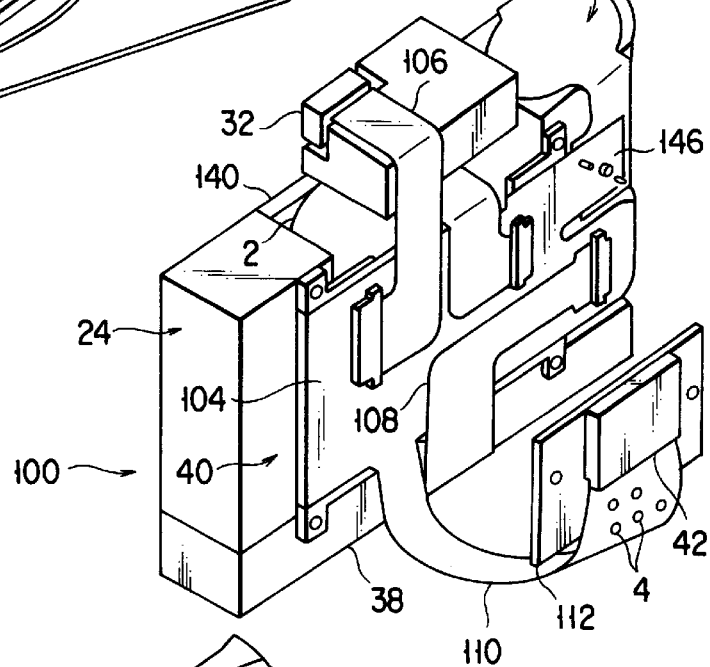
FIG. 2B is a perspective view showing a configuration of a camera body.
Figure 2C:
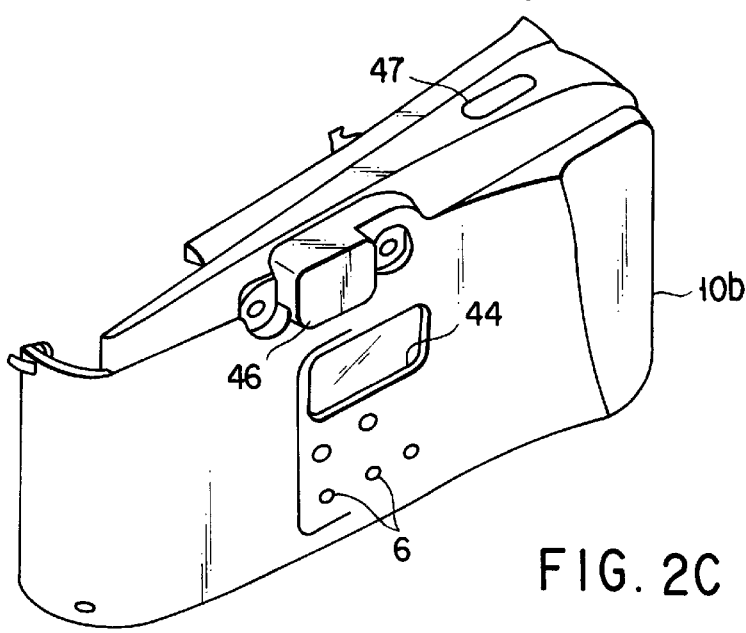
FIG. 2C is a perspective view showing a configuration of a rear cover.

As shown in FIGS. 2A, 2B and 2C, the camera according to the present embodiment comprises a camera body 100, which includes a film cartridge compartment 22, a spool compartment 24, an exposure unit including a lens barrel 2, etc., and a sheath component (front and rear covers 10*a* and 10*b*) for storing the body 100. The front cover 10*a* is loaded with both a flashlight emission unit 15 and an electric circuit unit 118 for activating the unit 15.

The camera body 100 is provided with a flexible substrate unit 40 on its back surface that faces the rear cover 10*b*. The substrate unit 40 includes a main substrate 104 bonded to the back surface of a film pressure plate (not shown) and flexible printed boards extending from the substrate 104.

For example, a first flexible printed board 106 is connected to an AF unit 32 that is formed integrally with the camera body 100, while a second flexible printed board 108 is connected to a motor drive unit 38 that is integral with the body 100. For example, moreover, a third flexible printed board 110 is connected to a liquid crystal display unit 42, which can be attached to a liquid crystal display window 44 of the rear cover 10*b*.

The liquid crystal display unit 42 is fixed to a backup plate 112, and can be attached to the liquid crystal display window 44 by screwing the plate 112 to the rear cover 10*b*. The third flexible printed board 110 is formed having switch patterns 4. Buttons 6 on the rear cover 10*b* are brought into contact with their corresponding switch patterns 4 when the backup plate 112 is screwed to the cover 10*b*. By selectively depressing the buttons 6, various photographing conditions (e.g., date of photographing, use of flashlight emission, etc.) can be displayed on the display unit 42, and photographing can carried out under the displayed photographing conditions.

The rear cover 10*b* is formed having a viewfinder eyepiece window 46, which is connected optically to a viewfinder objective window 116 of the front cover 10*a*. The rear cover 10*b* is provided with a mode changing button 47 for changing the photographing mode.

Further, the rear cover 10*b* is provided with an open-close lid (not shown). By taking off or putting on the lid, a battery (not shown) can be loaded into or unloaded from a battery compartment 50 (see FIG. 1A) that is formed in the front cover 10*a*. The lid may be provided on the front cover 1*a*.

As shown in FIGS. 1A, 1B and 1C, on the other hand, the front cover 10*a* is provided with an electric circuit unit mounting section 8, which is located adjacent to the battery compartment 50 and on which the electric circuit unit 118 can be mounted, and a flashlight emission unit mounting section 9 on which the flashlight emission unit 15 can be mounted.

The electric circuit unit mounting section 8 is provided with a support projection 8*a* and a support rack 8*b*, while the electric circuit unit 118 is provided with a dual-side mounting circuit board 122 having a charging circuit, emission circuit, etc. thereon. The electric circuit unit 118 can be mounted on the electric circuit unit mounting section 8 by engaging the circuit board 122 with the support projection 8a and the support rack 8b. In this state, the circuit board 122 is connect electrically to an electric contact (not shown) of the battery compartment 50. The charging circuit includes a booster coil 124, capacitor 126, etc., while the emission circuit includes a trigger coil 128, thyristor (or IGBT) 130, etc.

The flashlight emission unit mounting section 9 is provided with a pair of bearings 9a and a pair of support arms 9b. The flashlight emission unit 15 is furnished with a retractable stroboscope 132 and a support frame 134 for supporting the stroboscope 132. When the support frame 134 is pressed against the mounting section 9, a pair of shaft portions (not shown) that protrude from the frame 134 are supported by the bearings 9a, individually, and at the same time, the opposite ends of the frame 134 are supported by the support arms 9b, individually. Thus, the flashlight emission unit 15 can be attached to the flashlight emission unit mounting section 9.

When the flashlight emission unit 15 and the electric circuit unit 118 are on the front cover 10a, various cables that extend from the units 15 and 18 can be connected to on another by means of a junction substrate 136 on the front cover 10a. However, the junction substrate 136 is not an essential part, and the cables may be connected directly to one another.

The front cover 10a is provided with a manual operating member or shutter button 54, photographing aperture 12, and photometric aperture 102. It is further provided with a slidable barrier member 138, whereby the photographing aperture 12 can be opened or closed.

Referring now to FIGS. 2A, 2B and 2C, processes for assembling the camera of the invention will now be described in brief.

After the flashlight emission unit 15 and the electric circuit unit 118 are mounted on the front cover 10a, the camera body 100 is set on the front cover 10a. In this state, a pair of positioning protrusions 120a and 120b, which protrude from the front cover 10a, are fitted individually in a pair of fitting holes (not shown) in a reinforcing plate unit 140 of the camera body 100, whereupon the body 100 is positioned with respect to the front cover 10a.

Subsequently, an armature 144 of a flexible printed board 142 that extends from the circuit board 122 (see FIG. 1C) of the electric circuit unit 118 is fastened to a connecting piece 146 that is formed on the main substrate 104 of the camera body 100. Thereupon, the circuit unit 118 and the substrate 104 are connected electrically to each other.

Then, the liquid crystal display unit 42 is attached to the liquid crystal display window 44 by screwing the backup plate 112 to the rear cover 10b.

Figure 3A:
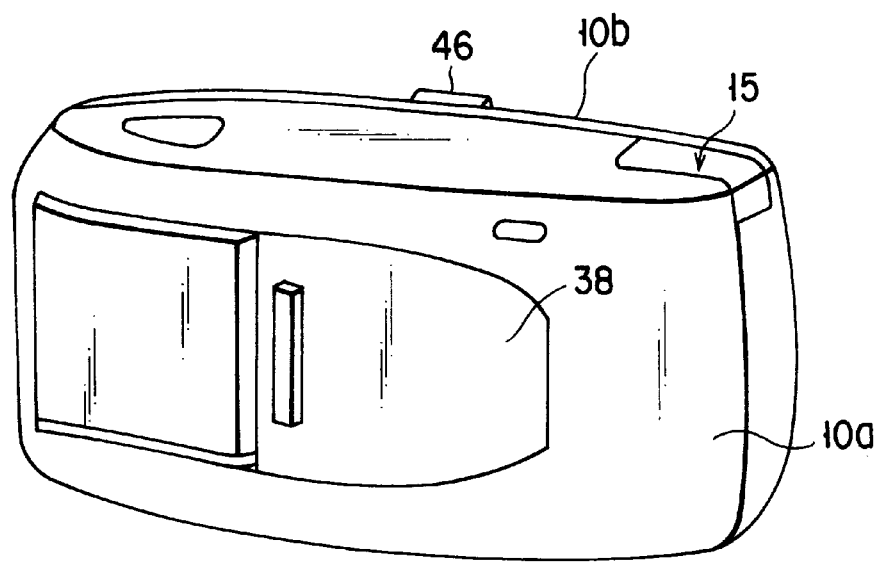
FIG. 3A is a perspective view of a camera.

Finally, the rear cover 10b is screwed to the front cover 10a, whereupon the camera is completed (see FIG. 3A) having its camera body 100 stored in the sheath component (front and rear covers 10a and 10b).

Figure 3B:
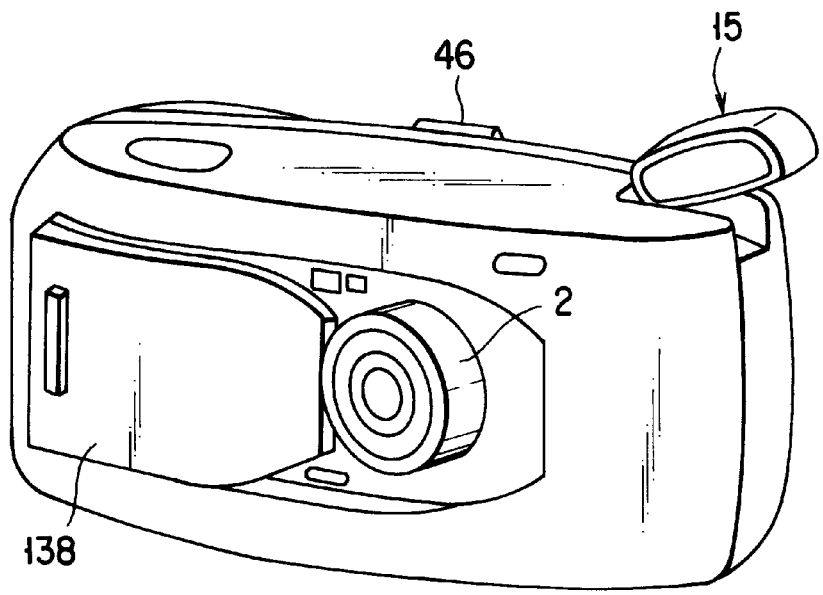
FIG. 3B is a perspective view showing a stroboscope raised by sliding a barrier member.

When the barrier member 138 is slid, the stroboscope 132 of the flashlight emission unit 15 rises up, and the photographing aperture 12 is opened to expose the lens barrel 2, whereupon photographing is allowed to be carried out (see FIG. 3B).

According to the present embodiment, as described above, the flashlight emission unit 15 and the electric circuit unit 118 for activating the unit 15 are mounted on the front cover 10a, so that the camera body 100 is compatible with cameras of various types. Thus, various cameras (e.g., cameras without a flashlight emission unit) for different purposes can be produced easily and efficiently by only changing the configuration of the sheath component (front and rear covers 10a and 10b) without changing that of the camera body 100.

According to the camera of the present embodiment, an operation test and a performance test on the flashlight emission unit 15 can be conducted by operating the manual operating member or shutter button 54 with the camera body 100 not in the sheath component (front and rear covers 10a and 10b). More specifically, a flashlight emission test and a performance security test on the flashlight emission unit 15 can be carried out by depressing the button 54 after setting only the sheath component in a specific tester (not shown).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
    a camera body;
    a sheath component that covers the camera body;
    a flashlight emission unit mounted on the sheath component; and
    an electric circuit unit that activates the flashlight emission unit;
    wherein the electric circuit unit is attached to the sheath component; and
    wherein the electric circuit unit comprises a charging circuit that includes at least a main capacitor of the flashlight emission unit.

2. A camera according to claim 1, wherein the sheath component is a front cover of the camera.

3. A camera according to claim 1, wherein the flashlight emission unit is movable with respect to the sheath component.

4. A camera adapted to receive power from a battery, the camera comprising:
    a camera body;
    a flashlight emission unit;
    an electric circuit unit that activates the flashlight emission unit;
    a battery compartment adapted to hold the battery; and
    a sheath component that covers the camera body;
    wherein the flashlight emission unit, the electric circuit unit, and the battery compartment are attached to the sheath component.

5. A camera comprising:
    a flashlight emission unit;
    a flashlight control circuit that activates the flashlight emission unit;
    a camera body formed of an aggregate of functional units for film exposure, not including the flashlight emission unit; and
    a sheath member that covers the camera body;
    wherein the flashlight emission unit and the flashlight control circuit are attached to the sheath body and form an exterior of the camera.

6. A camera according to claim 5, wherein the sheath member comprises a front cover and a rear cover of the camera.

7. A camera adapted to receive power from a battery, the camera comprising:

a battery compartment that holds the battery;

a flashlight unit;

a camera body formed of an aggregate of functional units for film exposure, not including the flashlight unit; and a sheath member that covers the camera body;

wherein the flashlight unit and the battery compartment are attached to the sheath member.

8. A camera according to claim 7, wherein the sheath member comprises a front cover and a rear cover.

9. A camera according to claim 7, wherein the sheath member is provided with a manual operating member that is capable of being manually operated to conduct an operation test and a performance security test on the flashlight unit before the sheath component covers the camera body.

10. A camera comprising:

a flashlight emission unit;

an electric circuit unit that activates the flashlight emission unit, said electric circuit unit having a charging circuit that charges light emitting energy and an emission circuit that applies an emission trigger signal to the flashlight emission unit;

a camera body; and a sheath component covering the camera body;

wherein the flashlight emission unit and the electric circuit unit are attached to the sheath component.

11. A camera according to claim 10, wherein the sheath component is provided with a flashlight emission unit mounting section on which the flashlight emission unit is mounted and an electric circuit unit mounting section on which the electric circuit unit is mounted.

12. A camera according to claim 10, wherein the flashlight emission unit comprises a stroboscope, and the stroboscope is retractable with respect to the sheath component.

13. A camera according to claim 10, wherein the sheath component is provided with a battery compartment that is adapted to hold a battery for applying electric power to the electric circuit unit.

* * * * *